May 18, 1965
G. P. STEEN
3,184,203
SUPPORT FOR FLANGED CONTAINER
Filed Feb. 17, 1964
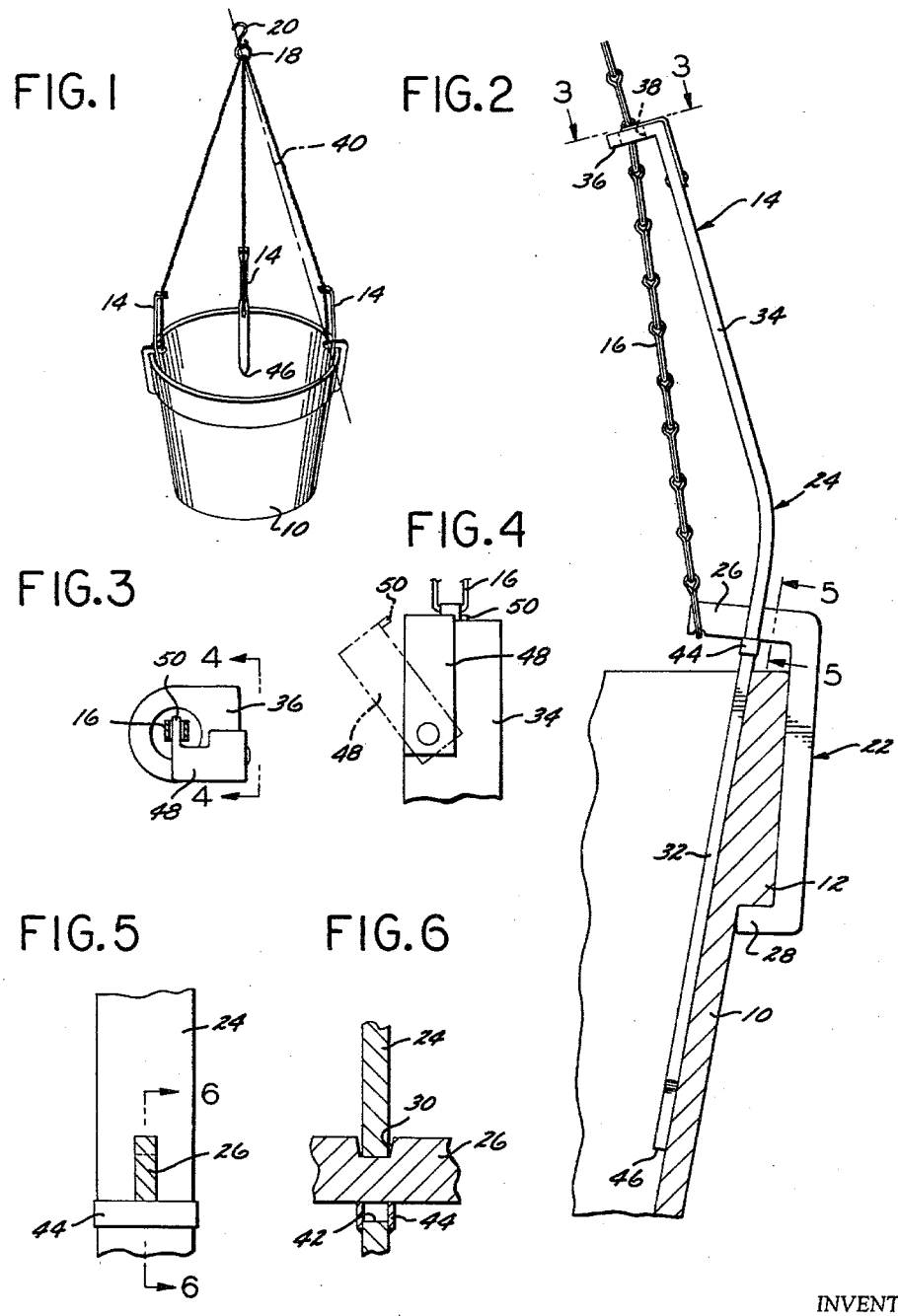
INVENTOR.
GUS P. STEEN
BY Zulwider, Patton, Rieber,
Lee, and Utecht
ATTORNEYS

United States Patent Office 3,184,203
Patented May 18, 1965

3,184,203
SUPPORT FOR FLANGED CONTAINER
Gus P. Steen, 4220 E. 1st St., Long Beach, Calif.
Filed Feb. 17, 1964, Ser. No. 345,198
5 Claims. (Cl. 248—318)

The present invention relates to a support for a flanged container, and more particularly to a support utilizing the outer marginal flange of a container for the overhead support or suspension thereof.

An object of the present invention is to provide a container support which is adapted to be readily and detachably mounted to the container for transportation or suspension of the container, without utilization of any bolts, pins, or similar fasteners which would require structural alteration or modification of the container.

Another object of the invention is the provision of a container support which may readily be applied to flanged containers of various sizes, and which is caused to grip the container flange by reason of the weight of the container.

A further object of the invention is the provision of a simple, durable, and inexpensive container support particularly adapted for use with flower pots and the like in that it does not detract from the appearance of the flower pot and in that it does not damage plants during its installation.

Yet another object of the invention is the provision of a container support of the aforementioned character which is not susceptible to accidental detachment from the container in the event that the weight of the flower pot was removed, as might momentarily occur in the event that the underside of the suspended flower pot were bumped.

Other objects and features of the invention will become apparent from consideration of the following description taken in connection with the accompanying drawings, in which:

FIG. 1 is a perspective view of a flower pot supported by a plurality of supports according to the present invention;

FIG. 2 is an enlarged, detail, side elevational view of one of the supports of FIG. 1, showing portions of the flower pot and the associated flexible suspension member;

FIG. 3 is an enlarged view taken along the line 3—3 of FIG. 2;

FIG. 4 is an enlarged view taken along the line 4—4 of FIG. 3;

FIG. 5 is an enlarged view taken along the line 5—5 of FIG. 2; and

FIG. 6 is an enlarged view taken along the line 6—6 of FIG. 5.

Referring now to the drawings, there is illustrated in FIG. 1 a usual and conventional container or flower pot 10 characterized by a wide circumferential or outer marginal shoulder or flange 12 adjacent the upper edge thereof, which flange is utilized for mounting three supports 14 arranged about the periphery of the pot 10. The supports 14 are connected to a corresponding plurality of elongated, flexible suspension members or chains 16 which extend upwardly from the supports 14 in convergent relationship for securement to and suspension from a common attachment point upon suitable overhead support structure, as by a ring 18 and a hook 20 adapted to hook onto a similar hook (not shown) in a ceiling, overhead beam or the like (not shown).

Referring now to FIGS. 2–6, each support 14 comprises an elongated member or clamp 22 and an elongated member or support 24 pivotally mounted to the clamp 22, both the clamp 22 and support 24 being cooperative with an associated chain 16 for gripping the flange 12 to support the pot 10, as will become apparent hereinafter.

The clamp 22 is vertically oriented for engagement with the vertical face of the outer marginal flange 12 and is characterized by a C-shape defined by an inwardly projecting upper portion or lever 26 overlying the upper edge margin of the flower pot 10, and an inwardly extending lower portion or hook 28 which engages the underside of the flower pot flange 12. In addition, as best viewed in FIGS. 5 and 6, the clamp lever 26 includes a notch 30 in its upper edge margin to afford pivotal movement of the clamp 22 relative to the support 14, as will be seen.

The lower end of each chain 16 is swaged or otherwise fixed to the inner extremity of the clamp lever 26 so that a strain upon the chain 16 has the effect of urging the hook 28 into firm engagement with the underside of the flower pot flange 12.

The support member 24 is elongated, vertically oriented, and slightly inwardly bowed at its midportion to define a lower portion 32, which bears against the inner surface of the flower pot 10, and an upper portion 34, which extends above the top of the flower pot and includes an inwardly projecting extremity or bent over tab 36 having an opening 38 therethrough. The opening 38 is of generous size to slidably receive the chain 16, and the orientation of the tab 36 locates the opening 38 outwardly of an imaginary axis 40, as best viewed in FIG. 1, extending between the hook 20 and the point of attachment between the lower end of the chain 16 and the cam lever 26. With this arrangement, any strain on the chain 16, as would be produced by the weight of the flower pot 10, tends to slide the chain 16 upwardly through the opening 38 and, when the slack is taken out of the chain, tends to urge the chain against the inner margin of the opening 38. This pivots the support member 24 upon the clamp 22 and brings the lower portion 32 of the support member 24 into firm engagement with the inner surface of the flower pot 10.

The pivotal association of the support member 24 and the clamp 22 is afforded by a transverse opening 42 provided in the support member 24 substantially intermediate the upper and lower portions thereof adjacent the bend in the support member. The opening 42 is sufficiently large to slidably receive the clamp lever 26, and a deformable locking band or collar 44 is disposed about the support member 24 immediately beneath the clamp lever 26 in the area of the notch 30. The support member 24 and the clamp 22 are pivotally secured together by urging the clamp 22 upwardly until the upper edge margin of the opening 42 is received within the notch 30. The collar 44 is then moved upwardly adjacent the clamp 22 and crimped to loosely retain the clamp 22 in position. That is, the collar 44 is not so close as to interfere with pivotal movement of the clamp 22 relative to the support member 24.

In operation, each support 14 is mounted upon the flower pot 10 by first spreading apart the support member 24 and clamp 22 to permit the clamp 22 to be mounted upon the outer marginal flange 12 and the support member 24 to be thrust downwardly into the dirt (not shown) in the flower pot. The lower end of the support member 24 is preferably sharpened to a point 46 to facilitate insertion thereof into the dirt. The hook 20 is then secured to suitable overhead structure to suspend the flower pot, and the consequent strain on each chain 16 pivots the clamp 22 upon the support member 24 to bring the hook 28 into firm engagement with the underside of the flower pot flange 12. This same strain causes the chain 16 to engage the inner margin of the opening 38 in the tab 36, pivoting the support member 24 upon the clamp 22 and firmly engaging the support member lower portion 32 upon the inner surface of the flower pot. Thus, the support member 24 and clamp 22 firmly grip the outer marginal flange 12 of the flower pot under the force of gravity and securely suspend the pot in position from the overhead support structure, the heavier the flower pot, the more forcible the gripping action.

In order to prevent disengagement of the support 14 from the flange 12, as might occur in the event of an accidental bumping of the pot 10 and consequent release of the strain on the chains 16, a locking element 48 is pivotally mounted upon each support member 24. Each locking element 48, as best viewed in FIGS. 2 through 4, includes a projecting finger 50 which is pivotable for entry into the central opening of one of the links of the associated chain 16. Thus, when the supports 14 are in operative position, supporting the flower pot 10, the locking elements 48 are pivoted to engage their associated chains 16, constraining them against movement relative to the support members 24, and preventing spreading of each of the clamp 22 and support member 24 out of engagement with the flange 12.

The supports 14 may be readily detached from the flower pot 10 by simply pivoting the locking elements 48 out of engagement with the chains 16 and thereafter disengaging the clamps 22 from the flange 12 to permit withdrawal of the support members 24 from the flower pot.

Various modifications and changes may be made with regard to the foregoing detailed description without departing from the spirit of the invention or the scope of the following claims.

I claim:

1. A support for a container having an outer marginal flange adjacent the upper edge thereof, said support comprising:
    a clamping member having an inwardly projecting upper portion and a lower portion adapted to engage the underside of an outer marginal flange of a container;
    an elongated, flexible suspension member connected at its lower extremity to the inner extremity of said upper portion of said clamping member and adapted to be fixed at its upper extremity to suitable supporting structure;
    and an elongated support member having a lower portion adapted to bear against the inner surface of a container and an upper portion upon which said suspension member is trained for slidable movement, said support member including means pivotally mounting said clamping member whereby the strain on said suspension member from the weight of a container tends to urge said lower portion of said clamping member into engagement with said outer marginal flange of a container, and tends to urge said suspenion member against said support member and pivot said support member upon said clamping member to urge said lower portion of said support member against an inner surface of a container.

2. A support for a container having an outer marginal flange adjacent the upper edge thereof, said support comprising:
    a clamping member having an inwardly projecting upper portion and a lower portion adapted to engage the underside of an outer marginal flange of a container;
    an elongated, flexible suspension member connected at its lower extremity to the inner extremity of said upper portion of said clamping member and adapted to be inwardly inclined for securement at its upper extremity to suitable supporting structure;
    and an elongated support member having a lower portion adapted to bear against the inner surface of a container and an upper portion having an opening through which said suspension member is trained for slidable movement, said support member including means pivotally mounting said clamping member outwardly of the connection of said suspension member to said clamping member whereby the strain on said suspension member from the weight of a container tends to urge said lower portion of said clamping member into engagement with an outer marginal flange of a container, and tends to urge said suspension member against said support member and pivot said support member upon said clamping member to urge said lower portion of said support member against an inner surface of said container.

3. A support for a container having an outer marginal flange adjacent the upper edge thereof, said support comprising:
    a clamping member having an inwardly projecting upper portion provided with a notch in the upper margin thereof and a lower portion adapted to engage the underside of an outer marginal flange of a container;
    an elongated, flexible suspension member connected at its lower extremity to the inner extremity of said upper portion of said clamping member and adapted to be inwardly inclined for securement at its upper extremity to suitable supporting structure;
    an elongated support member having a lower portion adapted to bear against the inner surface of a container and an upper portion including an inwardly projecting extremity having an opening through which said suspension member is trained for slidable movement, said support member including an opening pivotally receiving said clamping member at said notch whereby the strain on said suspension member from the weight of a container tends to urge said lower portion of said clamping member into engagement with an outer marginal flange of a container, and tends to urge said suspension member against said support member and pivot said support member upon said clamping member to urge said lower portion of said support member against an inner surface of a container;
    and lock means mounted to said support member adjacent said opening in said inwardly projecting extremity thereof and operative to engage said suspension member and constrain said suspension member against slidable movement relative to said support member whereby said clamping member cannot pivot out of engagement with an outer marginal flange.

4. A support for a container having an outer marginal flange adjacent the upper edge thereof, said support comprising:
    a clamping member having an inwardly projecting upper portion and a lower portion adapted to engage the underside of an outer marginal flange of a container;
    an elongated, flexible suspension member connected at its lower extremity to the inner extremity of said upper portion of said clamping member and adapted to be inwardly inclined for securement at its upper extremity to suitable supporting structure;
    and an elongated support member having a lower portion adapted to bear against an inner surface of a container and an upper portion having an opening through which said suspension member is trained for slidable movement, said support member including means pivotally mounting said clamping member whereby the strain on said suspension member from the weight of a container tends to urge said lower portion of said clamping member into engagement with an outer marginal flange of a container, and tends to urge said suspension member against the inner margin of said opening in said support member and pivot said support member upon said clamping member to urge said lower portion of said support member against an inner surface of a container.

5. In a support means for a flower pot having an outer marginal flange adjacent the upper edge thereof, wherein said support means includes a plurality of supports adapted to be arranged about the periphery of a flower pot, and further includes a corresponding plurality of elongated, flexible suspension members converging upwardly from said supports, respectively, to a common attachment point upon suitable overhead support structure, an improved support comprising:
- a clamping member having an inwardly projecting upper portion adapted to be connected at its inner extremity to the lower end of one of said suspension members, said clamping member further having a lower portion adapted to engage the underside of an outer marginal flange of a flower pot;
- and an elongated support member pivotally mounted to said upper portion of said clamping member and having a lower portion adapted to bear against an inner surface of a flower pot and an upper portion having an opening for slidably receiving said one of said suspension members, said opening being located outwardly of an axis extending between said common attachment point and the point of connection of said one of said suspension members to said inner extremity of said clamping member whereby the strain on said one of said suspension members from the weight of a flower pot tends to pivot said lower portion of said support member against an inner surface of a flower pot and tends to urge said lower portion of said clamping member into engagement with an outer marginal flange of a flower pot.

References Cited by the Examiner

UNITED STATES PATENTS

| | | | |
|---|---|---|---|
| 1,331,569 | 2/20 | Knapp | 248—318 |
| 1,419,307 | 6/22 | Richardson | 248—318 |
| 2,533,845 | 12/50 | Stender | 248—318 |

CLAUDE A. LE ROY, *Primary Examiner.*